(12) United States Patent
Sonnier (10) Patent No.: US 7,424,027 B2
(45) Date of Patent: Sep. 9, 2008

(54) HEAD OF LINE BLOCKAGE AVOIDANCE SYSTEM AND METHOD OF OPERATION THEREOF

(75) Inventor: David P. Sonnier, Austin, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 1093 days.

(21) Appl. No.: 10/044,765

(22) Filed: Jan. 9, 2002

(65) Prior Publication Data

US 2002/0101876 A1    Aug. 1, 2002

Related U.S. Application Data

(60) Provisional application No. 60/260,428, filed on Jan. 9, 2001.

(51) Int. Cl.
*H04L 12/28* (2006.01)
(52) U.S. Cl. .................. 370/414; 370/236; 370/413
(58) Field of Classification Search ............. 370/236, 370/413, 414
See application file for complete search history.

(56) References Cited

U.S. PATENT DOCUMENTS

| | | | | |
|---|---|---|---|---|
| 5,539,729 | A * | 7/1996 | Bodnar | 370/232 |
| 6,667,983 | B1 * | 12/2003 | Lo et al. | 370/412 |
| 6,912,225 | B1 * | 6/2005 | Kohzuki et al. | 370/412 |
| 6,938,097 | B1 * | 8/2005 | Vincent et al. | 709/240 |
| 6,963,576 | B1 * | 11/2005 | Lee | 370/411 |
| 2001/0050916 | A1 * | 12/2001 | Krishna et al. | 370/419 |
| 2002/0085578 | A1 * | 7/2002 | Dell et al. | 370/422 |

* cited by examiner

*Primary Examiner*—Firmin Backer
*Assistant Examiner*—Jason Mattis (57) ABSTRACT

A head of line blockage avoidance system for use with network systems that employ packets having an associated priority and a method of operation thereof. In one embodiment, the head of line blockage avoidance system includes: (1) m inputs, m numbering at least two, configured to receive the packets, (2) n packet first-in-first-out buffers (FIFOs), n numbering at least three, each of the packet FIFOs configured to receive at least one of the packets from the m inputs, (3) a priority summarizer configured to generate a priority summary of the packets within the m inputs and the n packet FIFOs, and (4) a scheduler configured to cause one of the n packet FIFOs to be queued for processing based on the priority summary.

17 Claims, 4 Drawing Sheets

HEAD OF LINE BLOCKAGE AVOIDANCE SYSTEM AND METHOD OF OPERATION THEREOF

CROSS-REFERENCE TO PROVISIONAL APPLICATION

This application claims the benefit of U.S. Provisional Application No. 60/260,428 titled "FOUR CHANNEL GIGABIT ETHERNET ARCHITECTURE" to Roger N. Bailey, et al., filed on Jan. 9, 2001, which is commonly assigned with the present invention and incorporated herein by reference as if reproduced herein in its entirety.

CROSS-REFERENCE TO RELATED APPLICATIONS

This application is related to U.S. patent application Ser. No. 10/044,185, filed Jan. 9, 2002 and titled "A NON-BLOCKING CROSSBAR AND METHOD OF OPERATION THEREOF" to David B. Kramer, et al. The above-listed application is commonly assigned and co-pending with the present invention and is incorporated herein by reference as if reproduced herein in its entirety.

TECHNICAL FIELD OF THE INVENTION

The present invention is directed, in general, to network packet systems and, more specifically, to a non-blocking crossbar and method of operating the same.

BACKGROUND OF THE INVENTION

Communications networks are currently undergoing a revolution brought about by the explosive growth of Internet traffic and by the increasing demand for real-time information being delivered to a diversity of locations employing multiple protocols. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks consisted of the same type of network or networks that employed the same network protocol. Soon thereafter, multiple communications networks consisting of different network protocols and/or different transmission mediums where connected together. The network processing systems that interfaced between these multiple communications networks had to convert between different protocols and accommodate the timing and transmission requirements of each of the different transmission mediums.

At first, the transmission speeds of the communications networks were relatively slow and the network processing systems could keep up with the traffic. Soon thereafter, faster communications networks were developed and the network processing system encountered problems with connecting networks having different transmission speeds. More specifically, the network processing systems typically employ a crossbar to send multiple packets from one network to another network.

In network processing system, such as a crossbar, each packet typically has an assigned priority depending upon the importance of the packet or the importance of the associated network. However, since multiple packets may be queued up for transmission, a high priority packet may be behind a low priority packet for the same input. A problem can occur when a second input has packets with a priority higher than the low priority packet for the first input and both the first and second inputs are contending for the same output. The second input's packets will typically be processed before the low priority packet of the first input. Thus, the high priority packet of the first input is blocked behind the low priority packet until the low priority packet is processed. This problem is typically called head of line blockage and can occur anywhere in a system that processes multiple packets having different priorities from multiple sources. Head of line blockage may seriously effect throughput or bandwidth of network processing systems such as crossbars. In view of the ever increasing demand for higher transmission speeds these head of line blockage problems are highly undesirable.

Accordingly, what is needed in the art is a system to overcome the deficiencies of the prior art.

SUMMARY OF THE INVENTION

To address the above-discussed deficiencies of the prior art, the present invention provides a head of line blockage avoidance system for use with network systems that employ packets having an associated priority and a method of operating the same. In one embodiment, the head of line blockage avoidance system includes: (1) m inputs, m numbering at least two, configured to receive the packets, and (2) n packet first-in-first-out buffers (FIFOs), n numbering at least two, each of the packet FIFOs configured to receive at least one of the packets from the m inputs. Additionally, the head of line blockage avoidance system includes a priority summarizer configured to generate a priority summary of the packets within the m inputs and the n packet FIFOs, and a scheduler configured to cause one of the n packet FIFOs to be queued for processing based on the priority summary.

In another embodiment, the present invention provides a method of operating a head of line blockage avoidance system for use with network systems that employ packets having an associated priority, the method includes: (1) employing m inputs, m numbering at least two, configured to receive the packets, (2) employing n packet first-in-first-out buffers (FIFOs), n numbering at least three, each of the packet FIFOs configured to receive at least one of the packets from the m inputs, (3) generating a priority summary of the packets within the m inputs and the n packet FIFOs, and (4) scheduling a one of the n packet FIFOs to be processed based on the priority summary.

The present invention also provides, in one embodiment, a crossbar head of line blockage avoidance system that employs packets having an associated priority. The crossbar head of line blockage avoidance system includes: (1) m physical interfaces, m numbering at least two, (2) m inputs, each of the inputs coupled to corresponding ones of the m physical interfaces to receive the packets, and (3) m outputs that transmit the packet to corresponding ones of the m physical interfaces. Each of the outputs include: (1) n packet first-in-first-out buffers (FIFOs), n numbering at least m, each of the packet FIFOs receives at least one of the packets from the m inputs, and (2) a destination FIFO interposing the n packet FIFOs and the output. The crossbar head of line avoidance system further includes a priority summarizer that generates a priority summary of the packets within the m inputs and the n packet FIFOs within each of the m outputs, and a scheduler that causes one of the n packet FIFOs for each of the m outputs to be queued for processing based on the priority summary.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
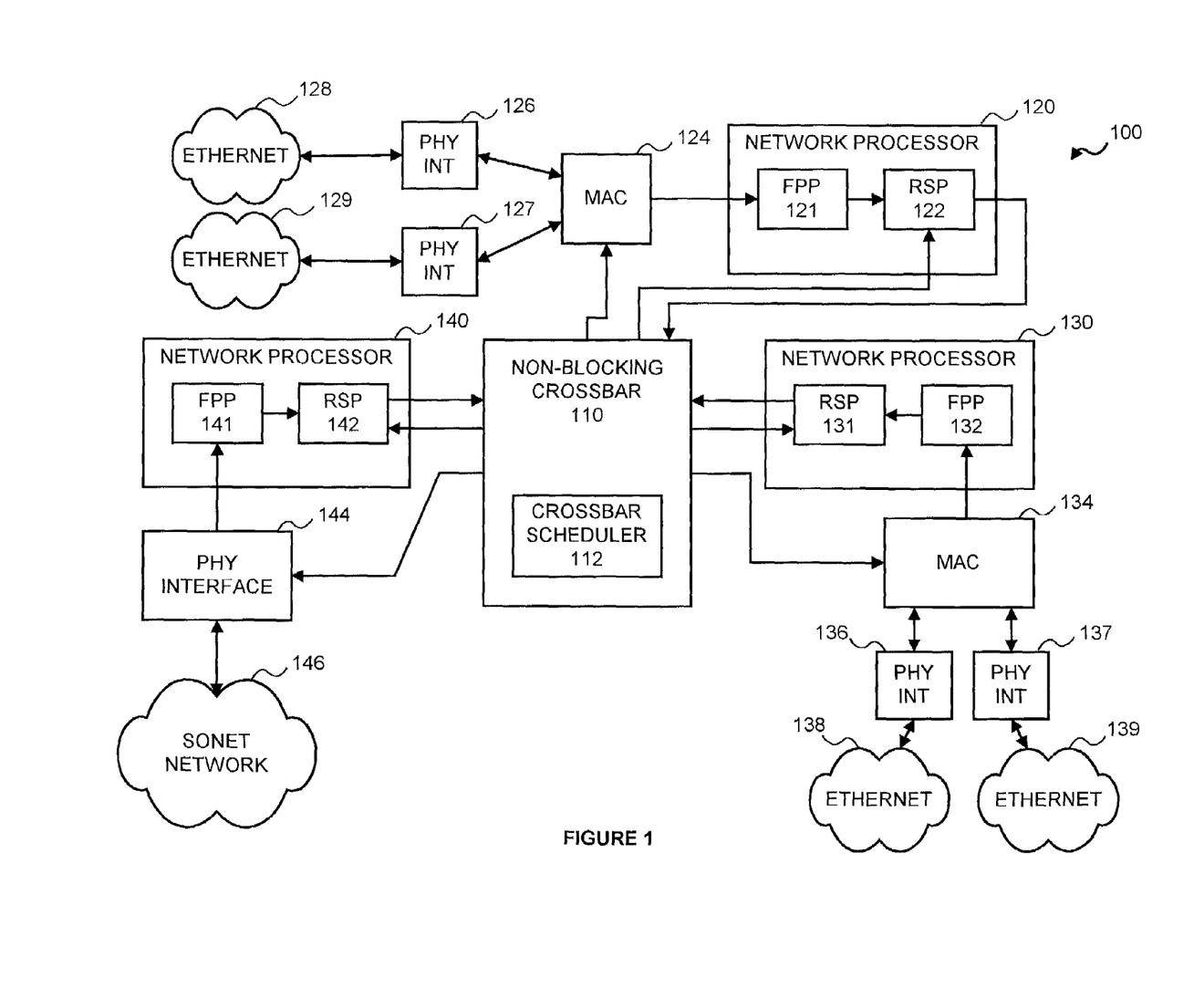
FIG. 1 illustrates a block diagram of an embodiment of a multi-channel network line card for packet based networks constructed in accordance with the principles of the present invention.

Referring initially to FIG. 1, illustrated is a block diagram of an embodiment of a multi-channel network line card for packet-based networks, generally designated 100, constructed in accordance with the principles of the present invention. The multi-channel network line card 100 is generally designed to transport packets between multiple networks. The multi-channel network line card 100 may also perform conversion between different protocols. The networks may be of different types, employ different transmission mediums, different communication speeds, or a combination thereof. In the illustrated embodiment, the multi-channel network line card 100 transports packet between four Gigabit ETHERNET networks 128, 129, 138, 139 and a Synchronous Optical Network (SONET) network 146. Of course, however, the present invention is not limited to the types of networks listed above. In other embodiments, the present invention may transport packets between other types of networks and may employ any number of networks.

The multi-channel network line card 100 includes a non-blocking crossbar 110 that is configured to transmit or transport packets between multiple inputs and multiple outputs. The non-blocking crossbar 110 performs functions similar to typical network crossbars, but is configured to transmit packets from multiple networks in a non-blocking manner. The non-blocking crossbar 110 may also perform additional functions in addition to the basic functions of a typical crossbar. For purposes of the present invention, the phrase "configured to" means that the device, the system or the subsystem includes the necessary software, hardware, firmware or a combination thereof to accomplish the stated task. The non-blocking crossbar 110 also includes a crossbar scheduler 112 that is configured to cause a packet to be transmitted from one of the crossbar inputs toward one of the crossbar outputs only when there is no contention. The non-blocking crossbar 110 and the crossbar scheduler 112 are discussed in more detail in FIG. 2.

In the illustrated embodiment, a first input of the non-blocking crossbar 110 is coupled to a first network processor 120 and a first output of the non-blocking crossbar 110 is coupled to a media access controller (MAC) 124. The MAC 124 is also coupled to first and second physical interfaces 126, 127, which in turn are coupled to corresponding Gigabit ETHERNET networks 128, 129. The first and second physical interfaces 126, 127 may be conventional network physical interfaces that interface with the Gigabit ETHERNET networks 128, 129 and the MAC 124.

The MAC 124, in one embodiment, is a conventional two channel ETHERNET media access controller. In another embodiment, a physical interface may include a MAC or any other type of network controller. The MAC 124 receives packets from the first and second physical interfaces 126, 127 and transmits the packets to first network processor 120. The MAC 124 also receives packets from the first output of the non-blocking crossbar 110 and transmits the packets to the appropriate first and/or second physical interfaces 126, 127.

The first network processor 120 is configured to convert a packet between protocols, classify the packet and may perform packet modification. The first network processor 120, in the one embodiment, may include a fast pattern processor (FPP) 121 and a routing switch processor (RSP) 122. The FPP 121 is configured to receive packets from the first and second physical interfaces 126, 127 via the MAC 124, analyze and classify the packet. The FPP 121 may also determine a priority of the packet based on a field within the packet or based on a type of the packet's contents. The RSP 122 is configured to receive the classified packet from the FPP 121, perform traffic management and convert the packet to the appropriate protocol if required. In the illustrated embodiment, the RSP 122 may convert the packet for transmission to the SONET network 146 or to any of the Gigabit ETHERNET networks 128, 129, 138, 139. Of course, however, the RSP 122 is not limited to converting between the networks listed above. In other embodiments, the RSP 122 may convert the packet to any type of protocol. Additionally, the first network processor 120 may also segment the packet into smaller blocks for processing by the non-blocking crossbar 110.

The RSP 122 also sends the converted packet to the non-blocking crossbar 110 for transmission to a specified output. The crossbar scheduler 112, in one embodiment, communicates with the RSP 122 to indicate when the RSP 122 may send the next packet. The crossbar scheduler 112 may also receive a priority associated with the packet from the RSP 122 to be used when the crossbar scheduler 112 schedules packets to be transmitted from the inputs toward the outputs. In another embodiment, the crossbar scheduler 112 may assign a priority to the packet and inform the RSP 122. Of course, however, other methods of assigning a priority to packet may be used.

Additional background information concerning the FPP and the RSP are discussed in U.S. patent application Ser. No. 9/798,472, titled "A VIRTUAL REASSEMBLY SYSTEM AND METHOD OF OPERATION THEREOF," and in U.S. patent application Ser. No. 9/822,655, titled "A VIRTUAL SEGMENTATION SYSTEM AND METHOD OF OPERATION THEREOF." Both of the above-listed applications are incorporated herein by reference as if reproduced herein in their entirety.

A second input of the non-blocking crossbar 110 is coupled to a second network processor 130 and a second output of the non-blocking crossbar 110 is coupled to a MAC 134. The MAC 134 is also coupled to third and fourth physical interfaces 136, 137, which in turn are coupled to corresponding Gigabit ETHERNET networks 138, 139. The third and fourth physical interfaces 136, 137 may be conventional network physical interfaces that interface with the Gigabit ETHERNET networks 138, 139 and the MAC 134.

The MAC 134, in one embodiment, is a conventional two channel ETHERNET media access controller. In another embodiment, a physical interface may include a MAC or any other type of network controller. The MAC 134 receives packets from the third and fourth physical interfaces 136, 137 and transmits the packets to second network processor 130. The MAC 134 also receives packets from the second output of the non-blocking crossbar 110 and transmits the packets to the appropriate third and/or fourth physical interfaces 136, 137.

The second network processor 130 has the same capabilities and performs the same types of functions as the first network processor 120. The second network processor 130, in the one embodiment, may include an FPP 131 and an RSP 132. The FPP 131 is configured to receive packets from the third and fourth physical interfaces 136, 137 via the MAC 134. The RSP 132 is configured to receive packets from the FPP 131 and transmit the packets to the second input of the non-blocking crossbar 110. The FPP 131 and the RSP 132 have the same capabilities and perform the same types of functions as the FPP 121 and the RSP 122 respectively. Additionally, both the second network processor 130 and the RSP 132 have the same capabilities and can perform the same types of functions as described above for the first network processor 120, the RSP 122 and interfacing with the crossbar scheduler 112.

A third input of the non-blocking crossbar 110 is coupled to a third network processor 140 and a third output of the non-blocking crossbar 110 is coupled to a physical interface 144. The physical interface 144 is also coupled to the SONET network 146. The physical interface 144 may be a conventional network physical interface that interfaces with the SONET network 146. In another embodiment, the physical interface 144 may include a MAC or any other type of network controller. The physical interface 144 receives packets from the SONET network 146 and transmits the packets to third network processor 140. The physical interface 144 also receives packets from the third output of the non-blocking crossbar 110 and transmits the packets to the SONET network 146.

The third network processor 140 has the same capabilities and performs the same types of functions as the first network processor 120. The third network processor 140, in the one embodiment, may include an FPP 141 and an RSP 142. The FPP 141 is configured to receive packets from the physical interface 146. The RSP 142 is configured to receive packets from the FPP 141 and transmit the packets to the third input of the non-blocking crossbar 110. The FPP 141 and the RSP 142 have the same capabilities and perform the same types of functions as the FPP 121 and the RSP 122 respectively. Additionally, the third network processor 140 and the RSP 142 have the same capabilities and can perform the same types of functions as described above for the first network processor 120, the RSP 122 and interfacing with the crossbar scheduler 112.

Figure 2:
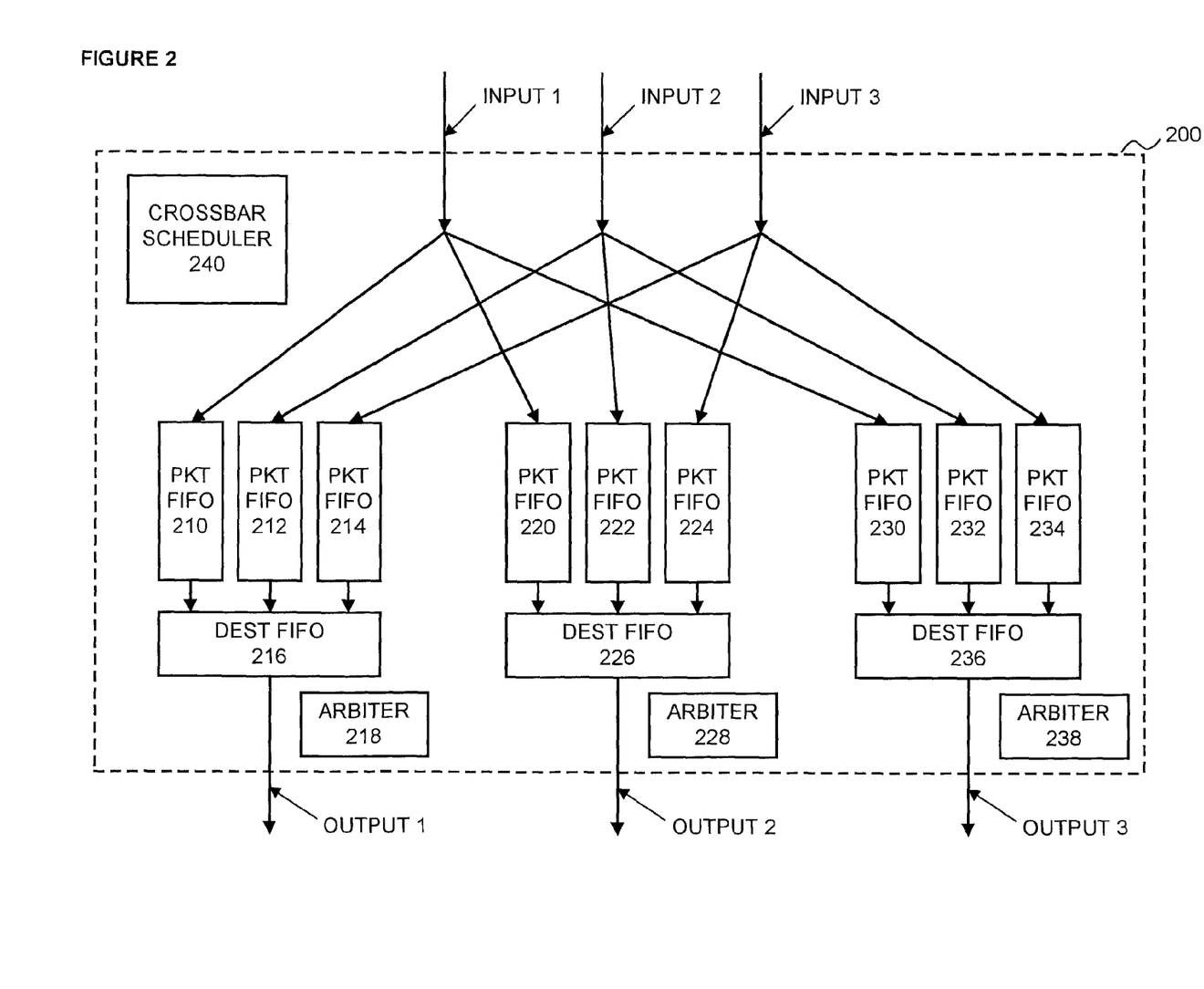
FIG. 2 illustrates a block diagram of an embodiment of a non-blocking crossbar constructed in accordance with the principles of the present invention.

Turning now to FIG. 2, illustrated is a block diagram of an embodiment of a non-blocking crossbar, generally designated 200, constructed in accordance with the principles of the present invention. The non-blocking crossbar 200, in one embodiment, may be employed in a multi-channel network line card similar to the one illustrated in FIG. 1. The non-blocking crossbar 200 is configured to transmit or transport packets between multiple inputs and multiple outputs. The non-blocking crossbar 200 performs functions similar to typical network crossbars, but is advantageously configured to transmit packets from multiple networks in a non-blocking manner. The non-blocking crossbar 200 may also perform additional functions in addition to the functions performed by the typical crossbar.

In the illustrated embodiment, the non-blocking crossbar 200 includes three inputs and three outputs. Each of the inputs is configured to receive packets from a network (or fabric) and may be coupled to network processors or physical interfaces similar to the ones illustrated in FIG. 1. Each of the inputs, in one embodiment, may also include a source first-in-first-out buffer (FIFO) (not shown) that is configured to hold at least one packet received from the network. The source FIFO may be used for rate decoupling. One skilled in the pertinent art is familiar with rate decoupling for networks.

Each of the outputs transmits received packets to a destination network via a physical interface (not shown). The first output includes a destination FIFO 216 that is configured to hold at least one packet. The first output also includes three packet FIFOs 210, 212, 214 interposing corresponding ones of the inputs and the destination FIFO 216. The first packet FIFO 210 interposes the first input and the destination FIFO 216, and is configured to receive and hold at least one packet. The second packet FIFO 212 interposes the second input and the destination FIFO 216, and is configured to receive and hold at least one packet. The third packet FIFO 214 interposes the third input and the destination FIFO 216, and is configured to receive and hold at least one packet. Each output of the present invention advantageously employs a packet FIFO for each of the inputs as part of the non-blocking capability of the non-blocking crossbar 200.

The packets contained within the packet FIFOs 210, 212, 214 are selectively transmitted one at a time to the destination FIFO 216. The packet within the destination FIFO 216 is transmitted to the first output if the first output is available to receive the packet. Since each of the packet FIFOs 210, 212, 214 contain a complete packet, the destination FIFO 216 always has a complete packet to transmit and does not have to wait for a partial packet. In one embodiment, the first output may also include an output arbiter 218 that is configured to select one of the packet FIFOs 210, 212, 214 and transfer a packet therein to the destination FIFO 216. In a related embodiment, the output arbiter 218 is further configured to select one of the packet FIFOs 210, 212, 214 based upon a priority of the packets within the packet FIFOs 210, 212, 214. Of course, however, other methods of selecting which packets are to be transmitted are well within the broad scope of the present invention.

The second output of the non-blocking crossbar 200 includes a destination FIFO 226 and three packet FIFOs 220, 222, 224 interposing corresponding ones of the inputs and the destination FIFO 226. The third output of the non-blocking crossbar 200 includes a destination FIFO 236 and three packet FIFOs 230, 232, 234 interposing corresponding ones of the inputs and the destination FIFO 236. The second and third outputs contain identical types of elements that are configured in the same manner, have the same capabilities and perform the same types of functions as described above with the first output. In another embodiment, the second and third outputs may include output arbiters 228, 238, respectively, configured the same as the arbiter 218 and having the same capabilities and types of functions as the arbiter 218. The first, second and third outputs, however, may operate independently of each other and may have some variations depending upon the type of network the output is associated with.

The non-blocking crossbar 200 also includes a crossbar scheduler 240 configured to cause a packet to be transmitted from one of the inputs toward one of the outputs only when both the destination FIFO associated therewith and an interposing one of the packet FIFOs are available to contain the packet. For example, if a packet at the first input is to be transmitted to the second output, the crossbar scheduler 240 will first check to see if the packet FIFO 220 can contain the packet. The crossbar scheduler 240 also checks to see if the destination FIFO 226 can contain the packet. If both the packet FIFO 220 and the destination FIFO 226 can contain the packet, the crossbar scheduler 240 then causes the packet to be transmitted from the first input to the packet FIFO 220 of the second output. If the packet FIFO 220 or destination FIFO 226 is unavailable to contain the packet, the crossbar scheduler 240 may then determine if the first input has a packet that has the first output or the third output as its destination. If so, then the crossbar scheduler 240 performs the above described tests for the new output.

The use of a packet FIFO for each input within each output and the checking of both the packet FIFO associated with the input and destination FIFO allows a packet to be scheduled and not encounter contention for the output. Also, by the crossbar scheduler 240 checking if the input can transmit another packet to a different output if the desired output is unavailable will advantageously allow the non-blocking crossbar to maintain the bandwidth between the different networks.

The crossbar scheduler 240, in one embodiment, may select one of the inputs to process based upon a priority of the input. For example, one input may be more critical or it may be more important to maintain as much throughput as possible for that input. Therefore, that input may be assigned a higher priority in order to allow more packets to be processed for that input. In another embodiment, the crossbar scheduler 240 may select one of the outputs to process based upon a priority of the output. For example, the inputs may be scanned to determine which packets are to be sent to the output with the higher priority. Then, those inputs will be processed with a higher priority.

Figure 3:
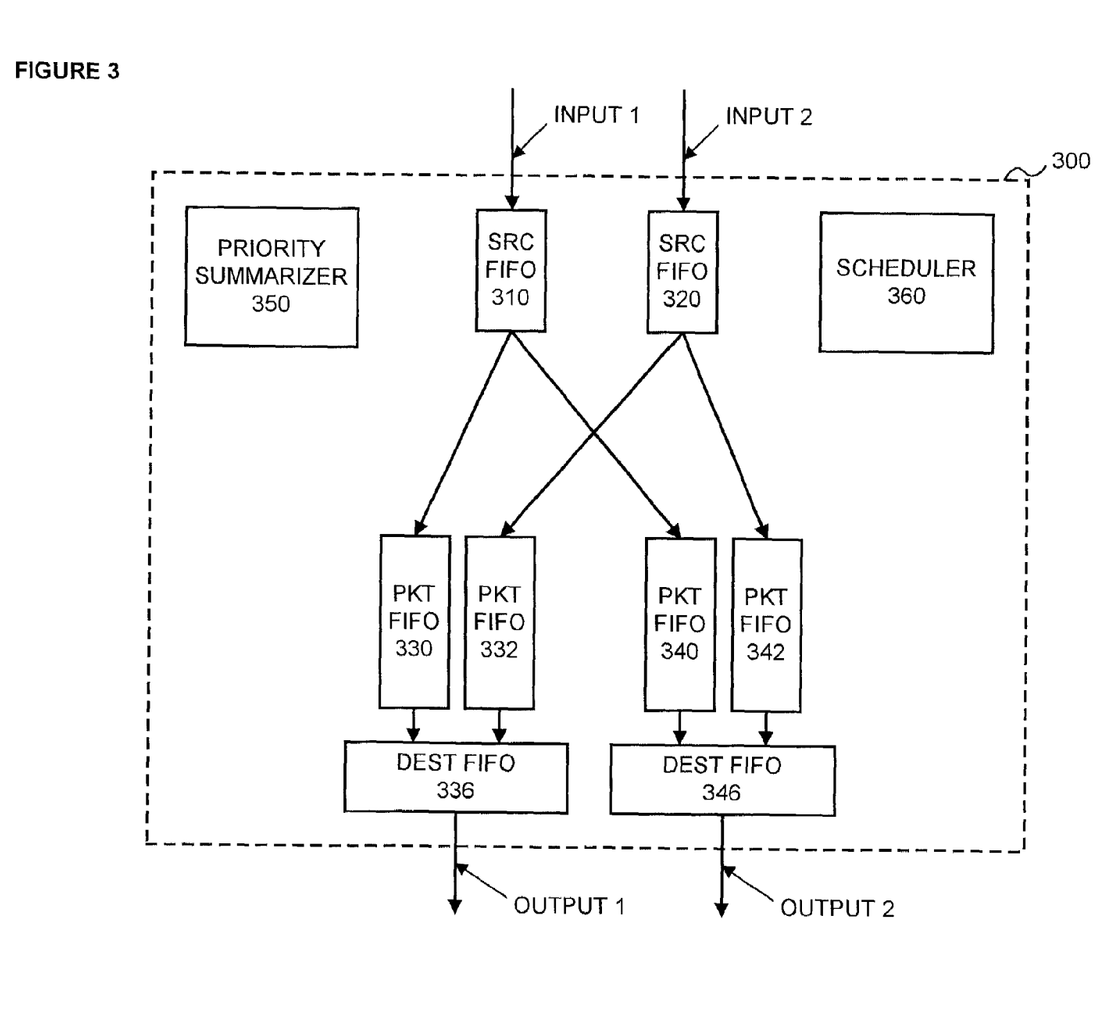
FIG. 3 illustrates a block diagram of an embodiment of a head of line blockage avoidance system constructed in accordance with the principles of the present invention.

Turning now to FIG. 3, illustrated is a block diagram of an embodiment of a head of line blockage avoidance system, generally designated 300, constructed in accordance with the principles of the present invention. The head of line blockage avoidance system 300 is for use with network system that employ packets having an associated priority and, in one embodiment, may be employed in a multi-channel network line card similar to the one illustrated in FIG. 1. In another embodiment, the head of line blockage avoidance system 300 may be employed within a non-blocking crossbar similar to the one illustrated in FIG. 2.

In the illustrated embodiment, the head of line blockage avoidance system 300 includes at least two inputs and two outputs. The inputs that are configured to receive packets having an associated priority from a network (or fabric). The inputs may be coupled to network processors or physical interfaces similar to the ones illustrated in FIG. 1. Each of the inputs, in one embodiment, may also include a source first-in-first-out buffer (FIFO) configured to hold at least one packet received from the network. In the illustrated embodiment, the first input includes a first source FIFO 310 and the second input includes a second source FIFO 320. The source FIFOs 310, 320 may be used for rate decoupling. One skilled in the pertinent art is familiar with rate decoupling for networks.

Each of the outputs transmits received packets to a destination network via a physical interface (not shown). The first output may include a destination FIFO 336 that is configured to hold at least one packet for transmission to the first output. Associated with the first output are two packet FIFOs 330, 332 interposing corresponding ones of the inputs and the destination FIFO 336. The first packet FIFO 330 interposes the first input and the destination FIFO 336, and is configured to receive and hold at least one packet. The second packet FIFO 332 interposes the second input and the destination FIFO 336, and is configured to receive and hold at least one packet. In another embodiment, the first packet FIFO 330 interposes a first source FIFO 310 and the destination FIFO 336, and the second packet FIFO 332 interposes a second source FIFO 320 and the destination FIFO 336.

The second output may include a destination FIFO 346 that is configured to hold at least one packet for transmission to the second output. Associated with the second output are two packet FIFOs 340, 342 interposing corresponding ones of the inputs and the destination FIFO 346. The third packet FIFO 340 interposes the first input and the destination FIFO 346, and is configured to receive and hold at least one packet. The fourth packet FIFO 342 interposes the second input and the destination FIFO 346, and is configured to receive and hold at least one packet. In another embodiment, the third packet FIFO 340 interposes a first source FIFO 310 and the destination FIFO 346, and the fourth packet FIFO 342 interposes a second source FIFO 320 and the destination FIFO 346.

The head of line blockage avoidance system 300 further includes a priority summarizer 350. The priority summarizer 350 is configured to generate a priority summary of the packets within each of the inputs and the packet FIFOs 330, 332, 340, 342. In another embodiment, the priority summarizer 350 is further configured to generate a priority summary of the packets with each of the input, the packet FIFOs 330, 332, 340, 342 and the source FIFOs 310 and 320. In yet another embodiment, the priority summarizer 350 is configured to generate a priority summary of the packets within each of the packet FIFOs 330, 332, 340, 342 and the source FIFOs 310, 320 that are to be transferred to each of the packet FIFOs 330, 332, 340, 342.

The priority summary may indicate which of the packet FIFOs 330, 332, 340, 342 contains a packet having the highest priority or is to receive the packet having the highest priority from one of the inputs or source FIFOs 310, 320. The priority summary may itemize or group the summary by output, destination FIFO or individual packet FIFO. In another embodiment, the priority summary may further indicate an order in which to transfer packets contained with the packet FIFOs to their associated destination FIFOs. Of course, however, the present invention is not limited to the type of priority summary information described above. In other embodiments, the priority summary may contain additional or different types of information to avoid the problem of head of the line blockage.

Additionally, the head of line blockage avoidance system 300 includes a scheduler 360. The scheduler 360 is configured to cause one of the packet FIFOs 330, 332, 340, 342 to be queued for processing based on the priority summary. The priority summary may indicate the order in which transmit packets from the packet FIFOs 330, 332, 340, 342 to their associated destination FIFOs 336, 346. In one embodiment, the scheduler 360 may determine the processing based on a destination FIFO and/or the associated output.

For example, the scheduler 360 may determine from the priority summary which of the first and second packet FIFOs 330, 332 is to be queued to transfer one of the packets within the first and second FIFOs 330, 332 toward the destination FIFO 336 for transmission to the first output. The priority summary may indicate that the first FIFO 330 contains a packet having a low priority and the second FIFO 332 contains a packet having a medium priority. The priority summary may also indicate that the first source FIFO 310 contains a packet having a high priority and that the second source FIFO 320 contains a packet having a medium priority. In prior systems, since the first packet FIFO 330 contains the packet with a low priority and the second packet FIFO 332 contains the packet having a medium priority, the second packet FIFO 332 would be processed first. Then, since the second source FIFO 320 contains a packet also having a medium priority, the second packet FIFO 320 would be processed again. Thus, the packet having a high priority in the first source FIFO 310 is blocked by the packet having a low priority in the first packet FIFO 330.

In order to prevent head of line blockage of the packet having a high priority in the first source FIFO 310 by the packet having a low priority in the first packet FIFO 330, the scheduler 360 would queue the first packet FIFO 330 to be processed first. This would allow the packet having the low priority in the first packet FIFO 330 to be transferred to the destination FIFO 336. Then, the packet having a high priority would be transmitted toward the first packet FIFO 330 and the first packet FIFO 330 would be processed next. Thus, the head of line blockage is avoided.

The scheduler 360, in another embodiment, may assign priorities to each of the packets received and processed by the head of line blockage avoidance system 300 based upon a priority associated with each of the inputs, destinations, contents of the packets, or a combination thereof. The priority summarizer 350 and the scheduler 360 may perform the previously described functions on a global basis, on an individual output basis or a combination thereof. Additionally, the head of line blockage avoidance system 300 may be employed within or in conjunction with the non-blocking crossbars illustrated in FIGS. 1 and 2.

Figure 4:
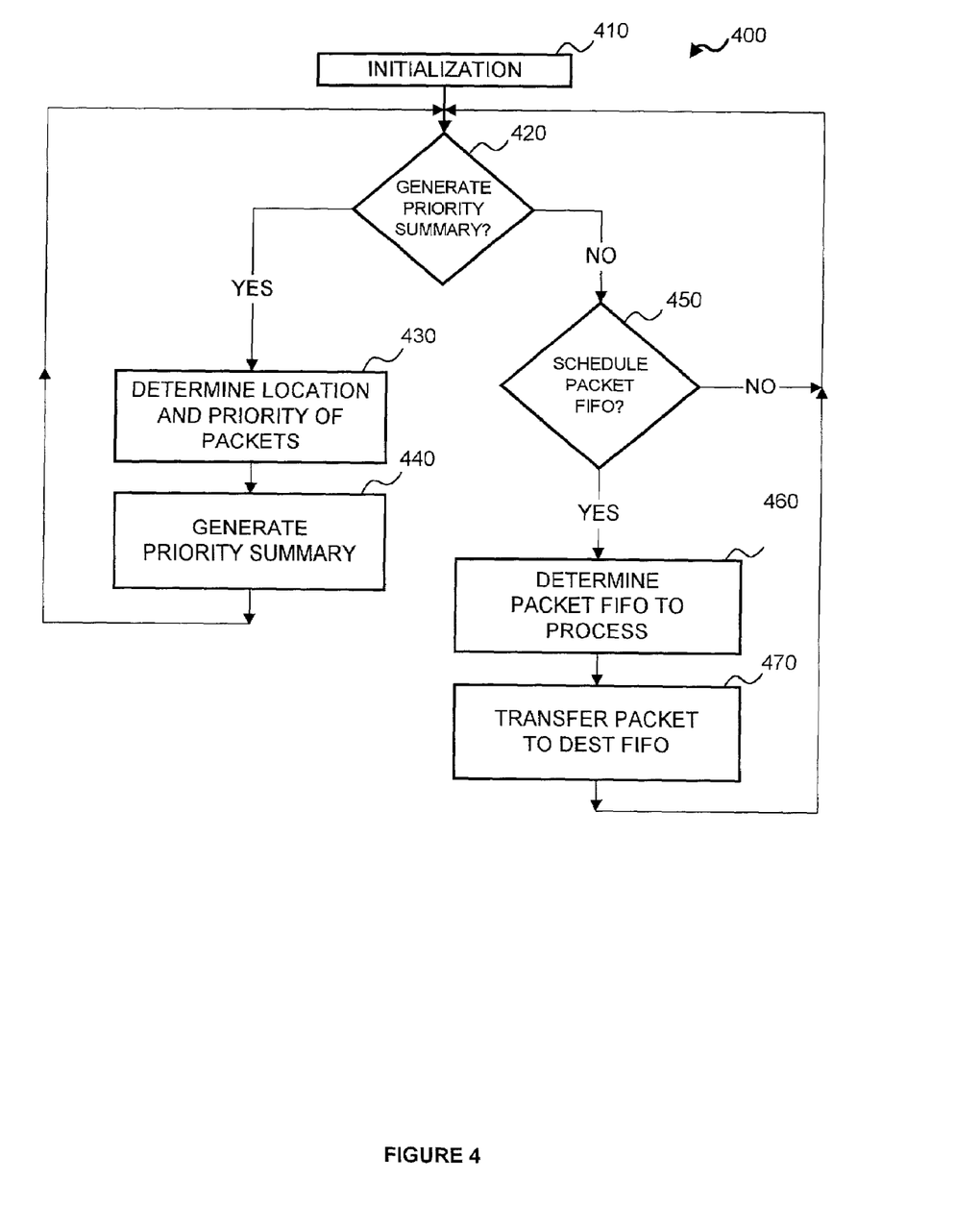
FIG. 4 illustrates a flow diagram of an embodiment of a method of operating a non-blocking crossbar constructed in accordance with the principles of the present invention.

Turning now to FIG. 4, illustrated is a method of operating a head of line blockage avoidance system, generally designated 400, constructed according to the principles of the present invention. The method 400 may be used with network systems employing packets having an associated priority. In FIG. 4, the method 400 first performs initialization in a step 410.

After initialization, the method 400 determines if it is to generate a priority summary for the packets associated with the head of line blockage avoidance system in a decisional step 420. If the method 400 is to generate a priority summary, the method 400 then determines the location and priority of the packets associated with the head of line blockage avoidance system in a step 430. The method 400, in one embodiment, may determine the location and priority of the packets within the inputs and the packet FIFOs. The method 400 may also determine the location and priority of the packets within the source FIFOs of each of the inputs.

Next, the method 400 generates the priority summary from the information collected in a step 440. In one embodiment, the method 400 may generate the priority summary of the packets within each of the packet FIFOs and the packets within the source FIFOs of each of the inputs that are to be transferred to each of the packet FIFO. Since a source FIFO may contain packets having different destinations, the method 400 should account for the order of the packets in the source FIFO and their destinations in order avoid the problem of head of the line blockage.

The priority summary may indicate which of the packet FIFOs contain a packet having the highest priority or is to receive the packet having the highest priority from one of the inputs. The priority summary may further indicate an order in which to transmit packets contained within the packet FIFOs to a destination FIFO based upon the priority of the packets. Additionally, the priority summary may indicate the order in which to schedule the processing of the inputs or the inputs' source FIFOs. Next, the method 400 returns to determine if to generate another priority summary or schedule a packet FIFO in the decisional step 420.

If the method 400 determined not to generate a priority summary in the decisional step 420, the method then determines if it is to schedule a packet FIFO to be processed in a decisional step 450. If the method 400 is not to schedule a packet FIFO to be processed, the method 400 then returns to determine if to generate another priority summary or schedule a packet FIFO in the decisional step 420. If the method 400 is to schedule a packet FIFO to be processed, the method 400 then determines which packet FIFO to process in a step 460. The method 400 determines which packet FIFO to process based on the priority summary. For example, the method 400 may schedule the first packet FIFO to be processed instead of the second packet FIFO due to a source FIFO of one of the inputs containing a packet having a higher priority then the packet contained in the second packet FIFO. In another embodiment, the method 400 may schedule the packet FIFOs to be processed based upon on a processing order indicated by the priority summary.

Next, the method 400 causes the transfer a packet from the selected packet FIFO to its associated destination FIFO for transmission to an output in a step 470. The method 400 then returns to determine if to generate another priority summary or schedule another packet FIFO in the decisional step 420.

One skilled in the art should know that the present invention is not limited to summarizing priority of packets within inputs, source FIFO and packet FIFOs. The present invention may produce a priority summary for packets throughout multiple layers of buffers, FIFOs and inputs. Also, the present invention is not limited to scheduling the packet FIFOs for processing. In other embodiments, the present invention may employ the priority summary to schedule or to cause to be queued for processing buffers, FIFOs, and/or inputs at any level where a head of line blockage may occur. Also, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use with network systems that employ packets having an associated priority, a head of line blockage avoidance system, comprising:

m inputs, m numbering at least two, configured to receive said packets;

n packet first-in-first-out buffers (FIFOs), n numbering at least two, each of said n packet FIFOs occupying a same hierarchical level and configured to receive at least one of said packets from said m inputs, said n packet FIFOs configured as m subsets of packet FIFOs, each of said packet FIFOs in each of said subsets being coupled to a different one of said m inputs;

a priority summarizer configured to generate a priority summary of said packets within said m inputs and said n packet FIFOs that indicates which of said n packet FIFOs is to receive a highest priority packet from one of said m inputs, wherein each of said n packet FIFOs can receive packets of two or more differing priorities;

a scheduler configured to cause packets in said n packet FIFOs to be queued for processing based on said priority summary such that packets in a packet FIFO that is to receive said highest priority packets are triggered to be processed before packets in other of said n packet FIFOs so that a lower priority packet in said n packet FIFO is scheduled for processing before a higher priority packet concurrently contained in another of said n packet FIFOs is scheduled for processing; and a destination FIFO and an output, said destination FIFO interposing said n packet FIFOs and said output, said scheduler further configured to transfer at least one of said packets from one of said m inputs toward said output only if said n packet FIFO and said destination FIFO are both available to simultaneously contain said packet.

2. The head of line blockage avoidance system as recited in claim 1 wherein said priority summary further indicates an order in which to transmit said at least one of said packets contained within said n packet FIFOs to a destination FIFO based upon packet priority.

3. The head of line blockage avoidance system as recited in claim 1 wherein each of said m inputs includes a source FIFO configured to contain at least one of said packets.

4. The head of line blockage avoidance system as recited in claim 3 wherein said priority summarizer is further configured to generate said priority summary of said packets within each of said n packet FIFOs and said packets within source FIFO of each of said m inputs that are to be transferred to said each of said n packet FIFOs.

5. The head of line blockage avoidance system as recited in claim 1 wherein said scheduler is further configured to assign said associated priority to each of said packets based on a priority associated with each of said m inputs or a destination.

6. The head line block system of claim 1, further comprising:
wherein said priority summarizer is further configured to generate a priority summary of said packets within said m inputs and said n packet FIFOs that indicates which of said n packet FIFOs either contains or is to receive a highest priority packet from one of said m inputs; and
wherein said scheduler is further configured to cause packets in said n packet FIFOs to be queued for processing based on said priority summary such that packets in a packet FIFO that either contains or is to receive said highest priority packets are triggered to be processed before packets in other of said n packet FIFOs.

7. For use with network systems that employ packets having an associated priority, a method of operating a head of line blockage avoidance system, comprising:
employing m inputs, m numbering at least two, configured to receive said packets;
employing n packet first-in-first-out buffers (FIFOs), n numbering at least three, each of said n packet FIFOs occupying a same hierarchical level and configured to receive at least one of said packets from said m inputs, said n packet FIFOs configured as m subsets of packet FIFOs, each of said packet FIFOs in each of said subsets being coupled to a different one of said m inputs;
generating a priority summary of said packets within said m inputs and said n packet FIFOs that indicates which of said n packet FIFOs is to receive a highest priority packet from one of said m inputs, wherein each of said n packet FIFOs can each receive packets of two or more priorities; and
scheduling packets in said n packet FIFOs to be processed based on said priority summary such that packets in a packet FIFO that is to receive said highest priority packets are triggered to be processed before packets in other of said n packet FIFOs so that a lower priority packet in said n packet FIFO is scheduled for processing before a higher priority packet concurrently contained in another of said n packet FIFOs is scheduled for processing,
wherein said scheduling further causes a packet to be transmitted from one of said m inputs toward an output only when both said n packet FIFO, selected to receive said packet, and an interposing destination FIFO, coupled to a plurality of said n packet FIFOs, only if said n packet FIFO that is selected to receive said packet and said destination FIFO are both available to simultaneously contain said packet.

8. The method as recited in claim 7 wherein said priority summary further indicates an order in which to transmit said at least one of said packets contained within said n packet FIFOs to a destination FIFO based upon packet priority.

9. The method as recited in claim 7 wherein each of said m inputs includes a source FIFO configured to contain at least one of said packets.

10. The method as recited in claim 9 wherein said generating further comprises generating said priority summary of said packets within each of said n packet FIFOs and said packets within said source FIFO of each of said m inputs that are to be transferred to said each of said n packet FIFOs.

11. The method as recited in claim 7 wherein said scheduling further comprises assigning said associated priority to each of said packets based on a priority associated with each of said m inputs or a destination.

12. The method of claim 7, further comprising:
generating a priority summary of said packets within said m inputs and said n packet FIFOs that indicates which of said n packet FIFOs either contains or is to receive a highest priority packet from one of said m inputs; and
scheduling packets in said n packet FIFOs to be processed based on said priority summary such that packets in a packet FIFO that either contains or is to receive said highest priority packets are triggered to be processed before packets in other of said n packet FIFOs.

13. A crossbar head of line blockage avoidance system that employs packets having an associated priority, comprising:
m physical interfaces, m numbering at least two;
m inputs, each of said inputs coupled to corresponding ones of said m physical interfaces to receive said packets;
m outputs that transmit said packet to corresponding ones of said m physical interfaces, each of said outputs having:
n packet first-in-first-out buffers (FIFOs), n numbering at least m, each of said n packet FIFOs occupying a same hierarchical level and configured to receive at least one of said packets from said m inputs, said n packet FIFOs configured as m subsets of packet FIFOs, each of said packet FIFOs in each of said subsets being coupled to a different one of said m inputs, and
a destination FIFO interposing said n packet FIFOs and said output;
a priority summarizer that generates a priority summary of said packets within said m inputs and said n packet FIFOs within each of said m outputs that indicates which of said n packet FIFOs is to receive a highest priority packet from one of said m inputs, wherein said n packet FIFOs can each receive packets of two or more priorities; and a scheduler that causes packets in said n packet FIFOs for each of said m outputs to be queued for processing based on said priority summary such that packets in a packet FIFO that is to receive said highest priority packets are triggered to be processed before packets in other of said n packet FIFOs so that a lower priority packet in said n packet FIFO is scheduled for processing before a higher priority packet concurrently contained in another of said n packet FIFOs is scheduled for processing; and a destination FIFO and an output, said destination FIFO interposing said n packet FIFOs and said output, said scheduler further configured to transfer at least one of said packets from said one of said inputs toward said output only if said n packet FIFO and said destination FIFO are both available to simultaneously contain said packet.

14. The crossbar head of line blockage avoidance system as recited in claim 13 wherein said priority summary further indicates an order in which to process said n packet FIFOs for each of said m outputs based upon packet priority.

15. The crossbar head of line blockage avoidance system as recited in claim 13 wherein each of said m inputs includes a source FIFO configured to contain at least one of said packets.

16. The crossbar head of line blockage avoidance system as recited in claim 15 wherein said priority summarizer generates said priority summary of said packets within each of said n packet FIFOs and said packets within said source FIFO of each of said m inputs that are to be transferred to said each of said n packet FIFOs.

17. The system of claim 13, further comprising:
wherein said priority summarizer is configured to generate a priority summary of said packets within said m inputs and said n packet FIFOs that indicates which of said n packet FIFOs either contains or is to receive a highest priority packet from one of said m inputs; and
wherein said scheduler is further configured to cause packets in said n packet FIFOs to be queued for processing based on said priority summary such that packets in a packet FIFO that either contains or is to receive said highest priority packets are triggered to be processed before packets in other of said n packet FIFOs.

* * * * *